US008813233B1

(12) United States Patent
Wilson et al.

(10) Patent No.: US 8,813,233 B1
(45) Date of Patent: Aug. 19, 2014

(54) MACHINE IMAGE INSPECTION

(75) Inventors: Matthew S. Wilson, Seattle, WA (US);
Julien J. Ellie, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 334 days.

(21) Appl. No.: 13/170,038

(22) Filed: Jun. 27, 2011

(51) Int. Cl.
*G06F 21/00* (2013.01)

(52) U.S. Cl.
USPC .............. 726/25; 726/22; 726/24; 718/1

(58) Field of Classification Search
None
See application file for complete search history.

(56) References Cited

U.S. PATENT DOCUMENTS

| 7,802,302 | B1* | 9/2010 | Nagarkar et al. | 726/24 |
| 8,352,939 | B1* | 1/2013 | Edwards et al. | 718/1 |
| 2006/0136720 | A1* | 6/2006 | Armstrong et al. | 713/164 |
| 2008/0184367 | A1* | 7/2008 | McMillan et al. | 726/23 |
| 2008/0263658 | A1* | 10/2008 | Michael et al. | 726/22 |
| 2009/0158432 | A1* | 6/2009 | Zheng et al. | 726/24 |

* cited by examiner

*Primary Examiner* — Jung Kim
*Assistant Examiner* — Robert Leung
(74) *Attorney, Agent, or Firm* — Knobbe, Martens, Olson & Bear, LLP

(57) ABSTRACT

Systems and methods are disclosed which facilitate the evaluation of machine images. A machine image inspection component processes requests for evaluation of machine images hosted on a virtual machine instance. In response to the request, the machine image inspection component selects executable code that can evaluate the requested machine image prior to instantiating the virtual machine instance with the requested machine image. Based on execution of the selected executable code, the machine image inspection can then process the results of the evaluation of the requested machine image accordingly.

34 Claims, 4 Drawing Sheets

MACHINE IMAGE INSPECTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, instances of a virtual machine may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which a computing device may process in order to implement the desired software configuration. At least a portion of the device images can be provided by third party providers that may include malware, root kits, viruses, or other types of malicious code or that may not conform to a service provider's best practices.

DETAILED DESCRIPTION

Generally described, aspects of the present disclosure relate to the management of virtual machine instances. Specifically, systems and methods are disclosed that facilitate the evaluation of machine images for target virtual machine instances. Illustratively, machine images can corresponds to code or instructions that specify combinations of operating systems or operating system configurations, virtualized hardware resources and software applications to be instantiated and executed on an instance of a computing device, such as a virtual machine or physical computing device. In one aspect, a machine image inspection processes requests for evaluation of machine images hosted on a virtual machine instance. In response to the request, the machine image inspection component selects executable code that can evaluate the requested machine image prior to, or without, instantiating the virtual machine instance with the requested machine image.

In one embodiment, the machine image inspection component can instantiate machine image inspection code in the form of an operating system kernel and other executable instructions that facilitates the evaluation of the requested machine image without executing the machine image. In one aspect, the evaluation of the machine image can correspond to the inspection of the machine image code for undesirable or malicious code or behaviors that are typically associated with viruses, root kits, and other malware. In another aspect, the evaluation of the machine image can correspond to the inspection of the machine image code to identify potential vulnerabilities or exploits or evaluate the overall integrity of the requested machine image that may affect the execution of the requested machine image. In a further aspect, the evaluation of the machine image can correspond to the determination of whether the requested machine image executes (or will execute) in a manner that adheres to a set of best practices or operating guidelines. In still another aspect, the evaluation of the machine image can correspond to the determination of whether the software applications associated with the requested machine image is associated with all required or proper licenses, permissions, authorizations, and the like.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to virtual machine instances running applications, one or more aspects of the present disclosure can be applied with physical computing devices or combinations of physical computing devices and virtual machine instances.

Figure 1:
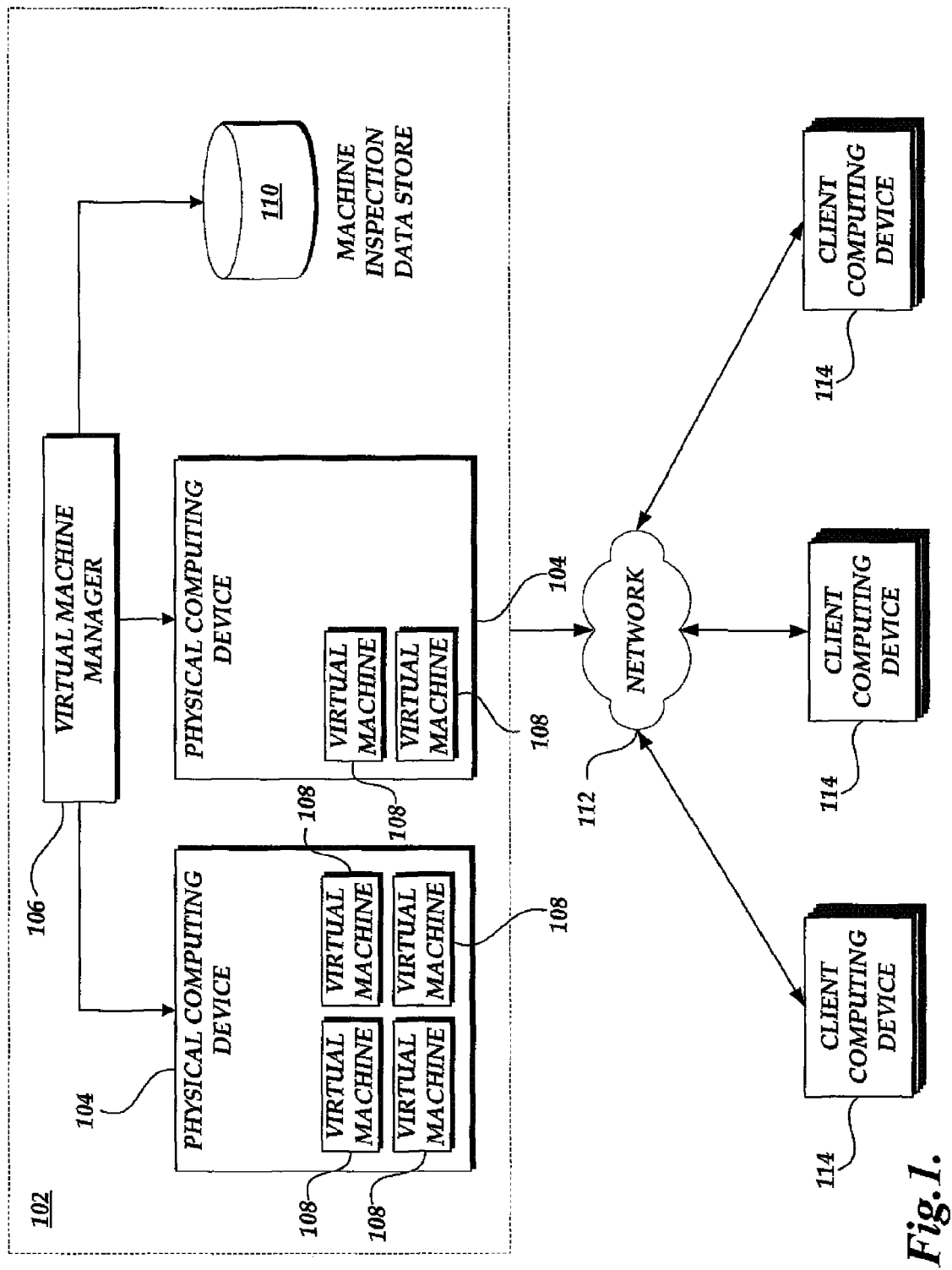
FIG. 1 is a block diagram depicting an illustrative environment for managing virtual machine instance types including a number of computing devices, a number of collections of computing devices, and a machine image inspection component.

FIG. 1 is a block diagram illustrating an embodiment of a virtual network environment 100. The virtual network environment 100 includes a virtual network 102 that includes multiple physical computing devices 104. Each physical computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions.

The virtual network 102 also includes machine image inspection component 106 for processing requests for evaluation of machine images on virtual machine instances. As will be explained in greater detail below with regard to FIGS. 2A and 2B, the machine image inspection 106 can select appropriate code for inspection of the requested machine image and instantiate the requested machine image in conjunction with the selected code. It should be appreciated that, although the machine image inspection component 106 is depicted for the purpose of example as a single, stand alone logical component in illustrative FIG. 1, the routines and steps performed by the machine image inspection component 106 may be distributed among any number of components and executed in hardware or software. Additionally, although the machine image inspection component 106 is illustrated as logically associated within the virtual network 102, the machine image inspection component 106 may be implemented in a separate networked environment, in conjunction with client computing devices 114, or otherwise integrated into other components/systems of the virtual network 102.

With continued reference to FIG. 1, the virtual network 102 can further include a machine inspection data store 110 for maintaining, at least in part, code for evaluating the machine images. In one embodiment, the machine inspection data store 110 can include executable code for performing an evaluation of a selected machine image, herein referred to as machine image inspection executable code. As previously described, the specific function of the machine image inspection code can vary according to various specified tasks/tests. The machine image inspection executable code can be in the form of an operating system kernel that allows for the loading of a target machine image on a virtual machine instance executing the inspection executable code. The machine inspection data store 110 can also include additional or alternative executable code optimized or configured for other specified evaluation tasks. The machine inspection data store 110 may correspond to network attached storage (NAS), database servers, local storage, or other storage configurations which may be implemented in a centralized or distributed manner.

Connected to the virtual network 102 via a network 112 are multiple client computing devices 114. The network 112 may be, for instance, a wide area network (WAN), a local area network (LAN), or a global communications network. In some instances, the client computing devices 114 may interact with the virtual network 102 to request the resource optimizations for virtual machine instance types based on a definition of one or more applications associated with the virtual machine instance type.

Figure 2A:
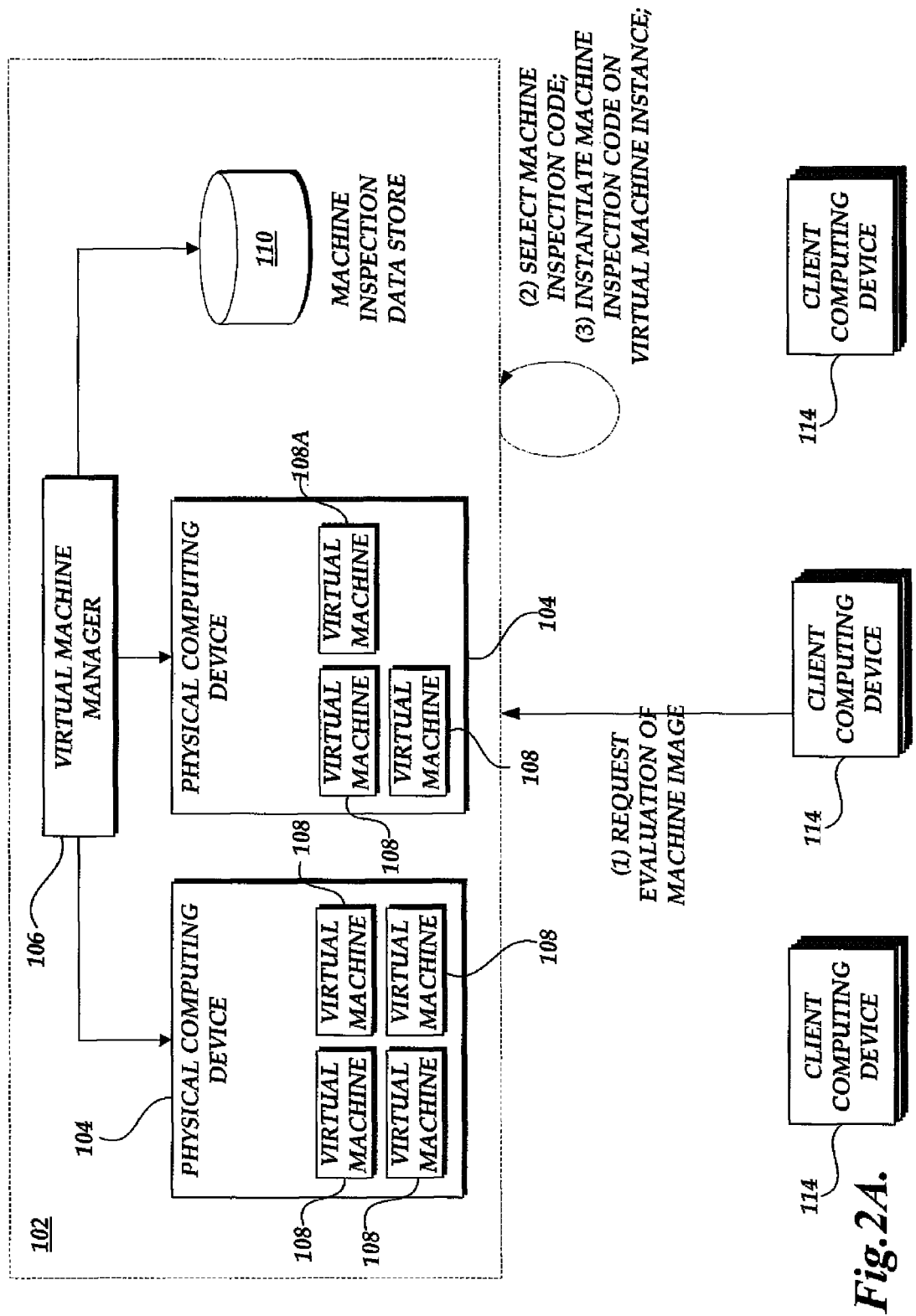
FIGS. 2A and 2B are simplified block diagrams of the virtual network of FIG. 1 illustrating the evaluation of selected machine images associated with a virtual machine instance type.
Figure 2B:
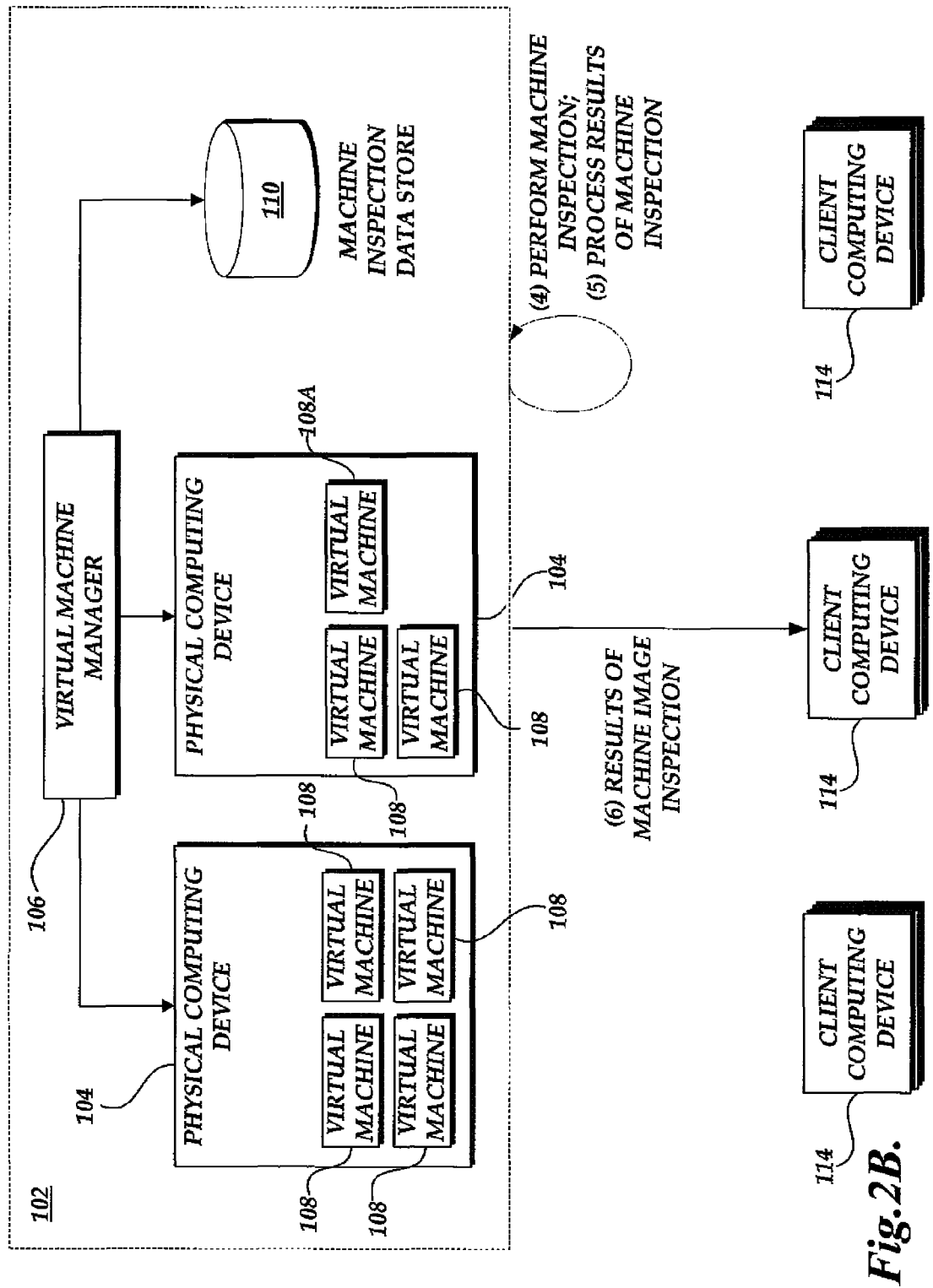

FIGS. 2A and 2B are block diagrams of the networked computing environment of FIG. 1 illustrating the processing of requests for evaluation of a machine image on a virtual machine instance by the machine image inspection component 106. With reference to FIG. 2A, a client computing device 114 requests evaluation of a machine image on a virtual machine instance. In one embodiment, the request to evaluate a machine image on a virtual machine instance can correspond to the transmission of a request by a client computing device 114 to the machine image inspection component 106 via an application protocol interface (API). Illustratively, the API can include the identification of the machine image that is to be executed on the instantiated virtual machine instance. In this embodiment, the request to evaluate the requested machine image may be part of a certification or qualification process, such as a requirement of a service provider or client. In another embodiment, the request to evaluate a machine image on a virtual machine instance can correspond to the transmission of a request by a client computing device 114 to instantiate the machine image inspection component 106. The request can also be transmitted in accordance with an API. In this embodiment, the machine image inspection component 106, or other component of the virtual network 102, may make the processing of the request dependent on the evaluation of the requested machine image. In a further embodiment, the machine image inspection component 106 can evaluate various criteria specified by a system administrator to determine that the requested machine image should be instantiated. For example, a system administrator may specify criteria, such as a number of requests or type of requests received by the virtual network 102, that should be interpreted by the machine image inspection component 106 as a request to instantiate the machine image on an instance of a virtual machine. In another example, the machine image inspection component 106 may determine a request to evaluate a machine image on a virtual machine instance can be based, at least in part, on the receipt or update of the machine image inspection executable code (e.g., an update to virus checking executable code).

Upon receipt of the request (either directly or inferred), the machine image inspection component 106 selects machine image inspection executable code from the machine image data store 110. Illustratively, the machine image inspection component 106 may select one or more candidate machine image inspection executable code(s) based on the type of evaluation required, the type or source of the request, a publisher of the machine image, and the like. For example, one client may request a detailed inspection of the machine image against all known type of malware, errors, or vulnerabilities, which may correspond to first machine image inspection executable code. Another client may request that only the minimal required inspection may be performed, which may correspond to different machine image inspection executable code. In another example, the machine image inspection component 106 may utilize machine image inspection executable code that has been configured to provide an evaluation of certain types of machine images or virtual machine instances. The machine image inspection executable code may be generated by the virtual network 102, client computing device 114, or other third party. Additionally, the machine image inspection component 106 may select multiple machine image inspection executable codes that can either be combined, implemented in a serial manner, or implemented in parallel. For example, the machine image inspection component 106 may maintain different machine image inspection executable code for error detection and malware detection.

Once one or more machine image inspection executable codes have been selected, or otherwise identified, the machine image inspection component 106 then causes the instantiation of a virtual machine instance (illustrated as virtual machine instance 108A) with the selected machine image inspection executable code (e.g., a selected machine image operating system kernel). Additionally, the machine image inspection component 106 causes the loading of the requested machine image on the instantiated virtual machine instance with the machine image inspection executable code.

With reference now to FIG. 2B, once the virtual machine instance 108A is instantiated with the selected machine image inspection executable code and loaded with the requested machine image, the machine image inspection executable code conducts an evaluation of the loaded machine image in accordance with the configuration/function of the machine image inspection kernel. For example, the machine image inspection executable code may conduct a scan for specific types of malware, viruses, root kits, etc. Additionally, in one embodiment, the machine image inspection executable code can perform the evaluation of the loaded machine image without executing the code in the machine image.

Upon completion of the evaluation (or execution of the machine image inspection executable code), the machine image inspection component 106 can then process the results of the machine image inspection. In one aspect, if the evaluation of the machine image did not result in the identification of any issues, the machine image inspection component 106 can then cause the instantiation of a virtual machine instance with the requested machine image. For example, the machine image inspection component 106, or other component of the virtual network 102, can cause the virtual machine instance 108A to replace, or substitute, the operating system kernels without requiring a reboot of the virtual machine instance, often referred to as a hot swap. In another example, the machine image inspection component 106, or other component of the virtual network 102, can cause a new virtual machine instance to be created with the requested machine image.

In another aspect, the machine image inspection component 106 can reject or fail the request for evaluation of the requested machine image in the event the evaluation of the machine image results in the identification of one or more issues. For example, in the event of the presence of malware, the machine image inspection component 106 can reject a request for instantiation of the machine image and terminate the virtual machine instance 108A. In another aspect, the machine image inspection component 106 can implement some type of publication or notification to the requesting client computing device 114 or other entity that provides a result of the evaluation. Additionally, the machine image inspection component 106 can implement the results of the evaluation in order to modify the execution of the machine image inspection executable code or provide a reporting function as to the type of issues identified or record the results of the evaluation in order to allow subsequent request for instantiation of the requested machine image to be processed accordingly.

Figure 3:
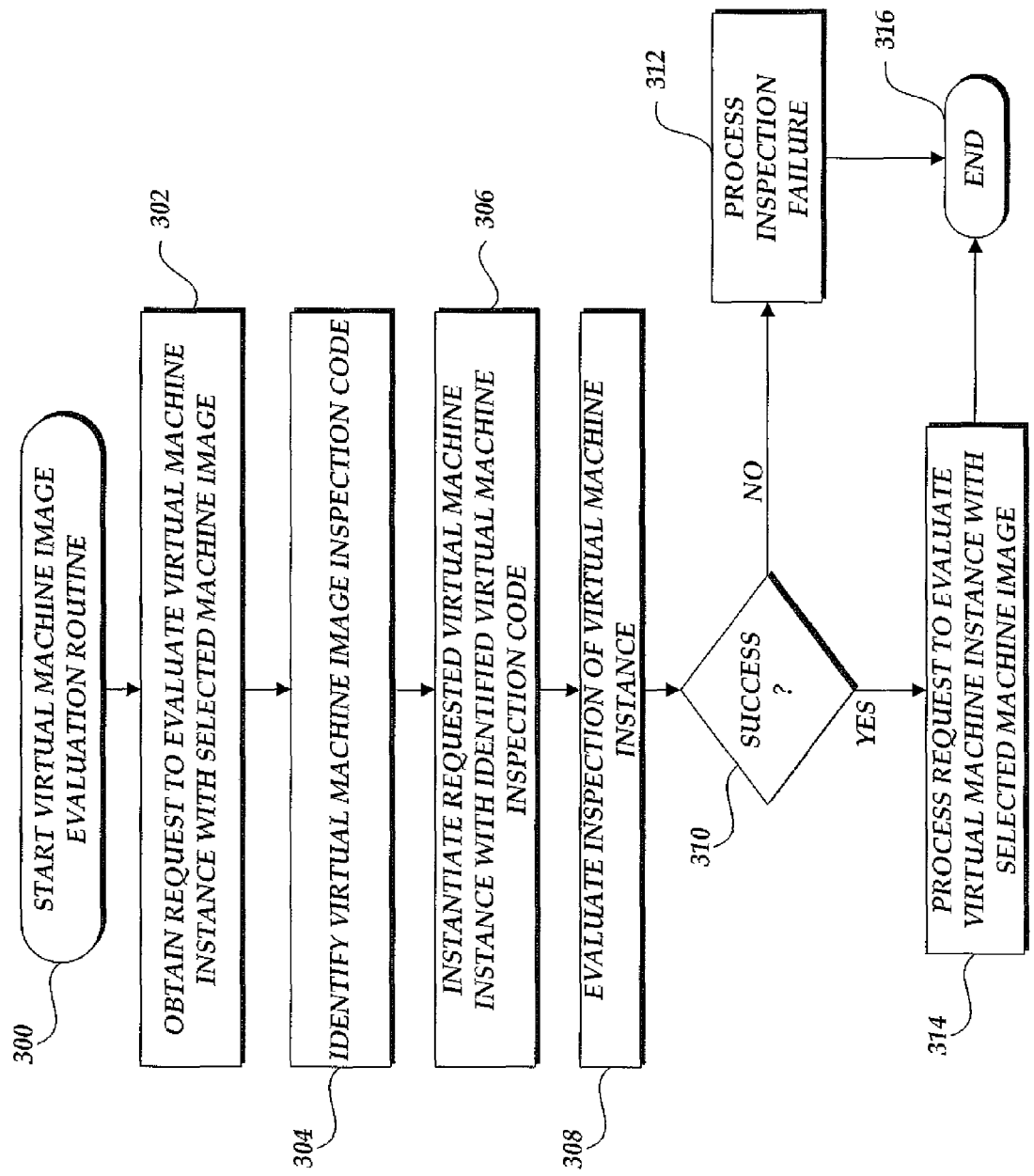
FIG. 3 is a flow diagram illustrating a virtual machine image inspection routine implemented by a machine image inspection component.

Turning now to FIG. 3, a routine 300 implemented by the machine image inspection component 106 for conducting an evaluation of a requested virtual machine instance will be described. Although routine 300 will be described with regard to implementation by the machine image inspection component 106, one skilled in the relevant art will appreciate that alternative components may implement routine 300 or that one or more of the blocks may be implemented by a different component or in distributed manner.

At block 302, the machine image inspection component 106 obtains a request to evaluate a machine image. In one embodiment, the request to instantiate a machine image on a virtual machine instance can correspond to the transmission of a request by a client computing device 114 to the machine image inspection component 106 via an application protocol interface (API). Illustratively, the API can include the identification of the machine image that is to be executed on the instantiated virtual machine instance. As previously described, the request can correspond to a request for the evaluation of the requested machine image. Alternatively, the request can correspond to a request to instantiate the requested machine image, which is then interpreted as also including a request to evaluate the requested machine image. In another embodiment, the machine image inspection component 106 can evaluate various criteria specified by a system administrator to determine that the machine image should be instantiated. For example, the machine image inspection component 106 may establish time-based criteria that require evaluation of machine images after a fixed amount of time.

At block 304, the machine image inspection component 106 identifies machine image inspection executable code that will be utilized to evaluate the selected machine image. Illustratively, the machine image inspection component 106 may select one or more candidate machine image inspection executable code(s) based on the type of evaluation required, the type or source of the request, a publisher of the machine image inspection executable code, and the like. For example, one client may request a detailed inspection of the machine image against all known type of malware, errors, or vulnerabilities, which may correspond to first machine image inspection executable code. Another client may request that only the minimal required inspection may be performed, which may correspond to different machine image inspection executable code. In another example, the machine image inspection component 106 may utilize machine image inspection executable code that has been configured to provide an evaluation of certain types of machine images with regard to adherence to best practices. The machine image inspection executable code may be generated by the virtual network 102, client computing device 114, or other third party. Additionally, the machine image inspection component 106 may select multiple machine image inspection executable codes that can either be combined, implemented in a serial manner, or implemented in parallel. For example, the machine image inspection component 106 may maintain different machine image inspection executable code for error detection and malware detection.

At block 306, the machine image inspection component 106 instantiates a virtual machine instance with the identified machine image inspection executable code. In one embodiment, the selected machine image inspection executable code can be correspond to stand alone executable code that can be instantiated with an instance of a virtual machine for purposes of conducting an evaluation of the requested machine image. The machine image inspection executable code can be configured in a manner that instance of the virtual machine is terminated upon completion of the evaluation. Alternatively, the machine image inspection executable code may be configured in a manner to facilitate a "hot swap" with additional or alternative operating system components at a later time for the continued execution of the requested machine image upon completion of the evaluation. In another embodiment, in another embodiment, the machine image inspection executable code may be combined with other operating system kernel that allows for the continued execution of the machine image if the evaluation is considered successful. At block 308, the machine image inspection component 106 causes the performance of the evaluation of the selected machine image with the execution of the machine image inspection executable code. In one embodiment, in the event that multiple machine image inspection executable codes are to be utilized, the machine image inspection component 106 may instantiate multiple instances of a virtual machine with each selected machine image inspection executable code and the requested machine image. As previously described, the instantiation of the multiple machine image inspection executable codes on multiple instances of a virtual machine may be conducted in series or in parallel, or a combination thereof.

At decision block 310, a test is conducted to determine whether the evaluation of the requested machine image (based on execution of the selected machine image inspection executable code) was successful. Illustratively, success of the evaluation can include a determination of whether any particular error conditions or target code (e.g., malicious code) has been identified. In another embodiment, the success of the evaluation can include a determination of whether a minimum or maximum number of issues have been identified. In a further embodiment, the success of the evaluation can include a calculation of a score based on the selected machine image inspection executable code and a comparison of the score to one or more thresholds. If the evaluation of the requested machine image is not considered successful, at block 312, the machine image inspection component 106 processes an inspection failure. For example, the machine image inspection component 106 can reject a request for instantiation of the requested machine image in the event the evaluation of the machine image results in the identification of one or more issues. In another aspect, the machine image inspection component 106 can implement some type of publication or notification to the requesting client computing device 114 that provides a result of the evaluation and the negative results. In a further embodiment, the machine image inspection component 106 can record the results and modify the machine image inspection executable code. Additional mitigation or processing results may also be implemented.

If at decision block 310, the results of the processing are considered successful, at block 314, the machine image inspection component 106 processes the request to evaluate the virtual machine image. In one embodiment, the machine image inspection component 106 can then cause the instantiation of a different operating system kernel intended for the proper execution of the requested machine image. In another embodiment, the machine image inspection component 106, or other component, can cause the instantiation of a new virtual machine instance with the requested machine image. In a further embodiment, the machine image inspection component 106 can implement some type of publication or notification to the requesting client computing device 114 that provides a result of the evaluation. Additionally, the machine image inspection component 106 can implement the results of the evaluation in order to provide a reporting function as to the type of issues identified. In a further embodiment, the machine image inspection component 106 can record the results and modify the machine image inspection executable code. At block 316, the routine 300 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing virtual machine instance types, comprising:
    obtaining, by a machine image inspection component, a request for evaluation of a machine image on an instance of a virtual machine;
    selecting, by the machine image inspection component, at least one machine image inspection executable code for evaluating the requested machine image without causing the execution of the requested machine image, wherein the at least one machine image inspection executable code includes an operating system kernel configured to evaluate machine images for malicious executable code;
    causing, by the machine image inspection component, instantiation of a virtual machine, wherein the virtual machine is configured to execute the at least one machine image inspection executable code including the operating system kernel;
    provisioning the instantiated virtual machine with the requested machine image without executing the requested machine image;
    receiving results of an inspection of the requested machine image by the least one machine image inspection executable code; and
    causing, by the machine image inspection component, the initiation of a mitigation technique if the results of the evaluation of the machine image indicate a presence of malicious executable code.

2. The method as recited in claim 1, wherein selecting at least one machine image inspection executable code includes selecting one or more machine image inspection code based, at least in part, on a level of inspection, a type of requested machine image, a service level agreement and a publisher of the requested machine image.

3. The method as recited in claim 1 further comprising, if the results of the evaluation of the machine image indicate no presence of malicious code includes, causing a replacement of the operating system kernel within the instantiated virtual machine with an operating system kernel of the requested machine image.

4. The method as recited in claim 3, wherein causing a replacement of the operating system kernel within the instantiated virtual machine with the operating system kernel of the requested machine image includes causing a replacement of the operating system kernel within the instantiated virtual machine with the operating system kernel of the requested machine image without halting the virtual machine instance.

5. The method as recited in claim 1, wherein the request for evaluation of the machine image corresponds to a request for instantiation of the machine image, and wherein causing the instantiation of a mitigation technique if the results of the evaluation of the machine image indicate a presence of malicious code includes rejecting the request for instantiation of the machine image.

6. The method as recited in claim 1, wherein causing the initiation of a mitigation technique if the results of the evaluation of the machine image indicate a presence of malicious code includes causing the modification of the at least one machine image inspection executable code based on the results of the evaluation of the machine image.

7. The method as recited in claim 1 further comprising causing, by the machine image inspection component, publication of results of the evaluation of the machine image.

8. The method as recited in claim 7, wherein the publication of results of the evaluation of the machine image include generation of a notification to a client computing device associated with the request for evaluation of the machine image.

9. The method as recited in claim 1 further comprising causing, by the machine image inspection component, instantiation of the machine image if the results of the evaluation of the machine image indicate no presence of malicious code.

10. A system managing virtual machine instances comprising:
   one or more computing devices, each having a processor and memory, the one or more computing device executing computer-executable instructions causing the one or more computing devices to:
      obtain a request for evaluation of a machine image on an instance of a virtual machine;
      select at least one machine image inspection executable code, the at least one machine image inspection executable code for evaluating the requested machine image;
      cause instantiation of a virtual machine executing the at least one machine image inspection executable code;
      provision the instantiated virtual machine with the requested machine image without executing the requested machine image;
      receive results of an evaluation of the requested machine image by the least one machine image inspection executable code; and
      process the results of the evaluation of the machine image.

11. The system as recited in claim 10, wherein the request for evaluation of the machine image is received in accordance with an application protocol interface.

12. The system as recited in claim 10, wherein the request for evaluation of the machine image corresponds to a request to instantiate the machine image on a virtual machine instance.

13. The system as recited in claim 10, wherein the request for evaluation of the machine image corresponds to the evaluation of criteria.

14. The system as recited in claim 10, wherein the computer-executable instructions cause the one or more computing devices to select the at least one machine image inspection code based, at least in part, on a level of inspection, a type of inspection, a type of requested machine image, a service level agreement or a publisher of the requested machine image.

15. The system as recited in claim 10, wherein the at least one machine image inspection executable code corresponds to an operating system kernel that, when executed by the instantiated virtual machine, configures the instantiated virtual machine to evaluate the requested machine image.

16. The system as recited in claim 10, wherein the at least one machine image inspection executable code corresponds to executable code to evaluate machine images for malicious executable code.

17. The system as recited in claim 10, wherein the at least one machine image inspection executable code corresponds to executable code to evaluate machine images according to at least one of known vulnerabilities, software licenses or a set of best practices.

18. The system as recited in claim 10, wherein the computer-executable instructions further cause the one or more computing devices to:
   select a plurality of sets of machine image inspection executable code; and
   cause instantiation of a plurality of virtual machine instances executing the selected plurality of machine image inspection executable code and provisioned with the requested machine image without executing the requested machine image; and
   wherein the results of the inspection of the requested machine image include results from the plurality of virtual machine instances.

19. The system as recited in claim 18, wherein the computer-executable instructions cause the one or more computing devices to instantiate the plurality of virtual machine in at least one of a sequence, in parallel or a combination of a sequence and parallel.

20. The system as recited in claim 10, wherein the computer-executable instructions further cause the one or more computing devices to cause the instantiation of the machine image if the results of the evaluation of the machine image indicate no issue.

21. The system as recited in claim 10, wherein the computer-executable instructions cause the one or more computing devices to process the results of the evaluation of the machine image at least in part by causing instantiation of a mitigation technique if the results of the evaluation of the machine image indicate a presence of an issue.

22. The system as recited in claim 21, wherein the instantiation of the mitigation technique includes generation of a notification to a client computing device associated with the request for evaluation of the machine image.

23. A method for managing virtual machine instances comprising:
   obtaining, by a machine image inspection component, a request for evaluation of a machine image on an instance of a virtual machine;
   selecting, by the machine image inspection component, at least one machine image inspection executable code from a data store, the at least one machine image inspection executable code for evaluating the requested machine image;
   causing, by the machine image inspection component, instantiation of a virtual machine executing the at least one machine image inspection executable code;
   provisioning, by the machine image inspection component, the instantiated virtual machine with the requested machine image, without executing the requested machine image;
   receiving, at the machine image inspection component, results of an inspection of the requested machine image by the least one machine image inspection executable code; and
   processing, by the machine image inspection component, the results of the evaluation of the machine image.

24. The method as recited in claim 23, wherein obtaining the request for evaluation of a machine image on an instance of a virtual machine includes inferring a request of instantiating the machine image based on evaluation of criteria.

25. The method as recited in claim 23, wherein selecting at least one machine image inspection executable code from the data store includes selecting one or more sets of machine image inspection code based, at least in part, on a level of inspection, a type of inspection, a type of requested machine image, a service level agreement or a publisher of the requested machine image.

26. The method as recited in claim 23, wherein the at least one machine image inspection executable code corresponds to an operating system kernel that, when executed by the instantiated virtual machine, configures the instantiated virtual machine to evaluate the machine image.

27. The method as recited in claim 23, wherein the at least one machine image inspection executable code corresponds to executable code to evaluate machine images for malicious executable code.

28. The method as recited in claim 23, wherein the at least one machine image inspection executable code corresponds to a plurality of sets of machine image inspection executable code, wherein causing instantiation of a virtual machine executing the at least one machine image inspection executable code includes instantiating a plurality of virtual machine instances executing the plurality of machine image inspection executable code, and wherein the results of the inspection of the requested machine image include results from the plurality of virtual machine instances.

29. The method as recited in claim 28, wherein instantiating a plurality of virtual machine instances includes instantiating the plurality of virtual machines in at least one of a sequence, in parallel and a combination of a sequence and parallel.

30. The method as recited in claim 23, wherein processing the results of the evaluation of the machine image includes causing, by the machine image inspection component, the instantiation of the machine image if the results of the evaluation of the machine image indicate no issue.

31. The method as recited in claim 23, wherein processing the results of the evaluation of the machine image includes causing, by the machine image inspection component, the instantiation of a mitigation technique if the results of the evaluation of the machine image indicate at least one issue.

32. The method as recited in claim 31, wherein causing the instantiation of a mitigation technique if the results of the evaluation of the machine image indicate at least one issue includes causing the mitigation technique if the results of the evaluation of the machine image indicate issues exceeding a threshold.

33. The method as recited in claim 23 further comprising causing, by the machine image inspection component, publication of results of the evaluation of the machine image.

34. The method as recited in claim 33, wherein the publication of results of the evaluation of the machine image include generation of a notification to a client computing device associated with the request for instantiation of the machine image.

* * * * *